March 6, 1934.  G. M. FROST  1,950,298
GRAVE MARKER
Filed March 22, 1933

G. M. Frost Inventor
By C. A. Snow & Co.
attorneys.

Patented Mar. 6, 1934

1,950,298

UNITED STATES PATENT OFFICE 1,950,298

GRAVE MARKER

George M. Frost, Ashland, Oreg.

Application March 22, 1933, Serial No. 662,146

1 Claim. (Cl. 40—124.5)

This invention relates to a marker designed for use primarily in marking graves.

An object of the invention is to provide a marker which may be driven into the ground surface to securely position the marker against accidental displacement.

Another important object of the invention is to provide a marker embodying a head constructed of substantially thin material, so that the head will embed itself in the ground surface, and will not interfere with the use of lawn mowing machines, in mowing the grass adjacent to the grave.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing.

Figure 1:
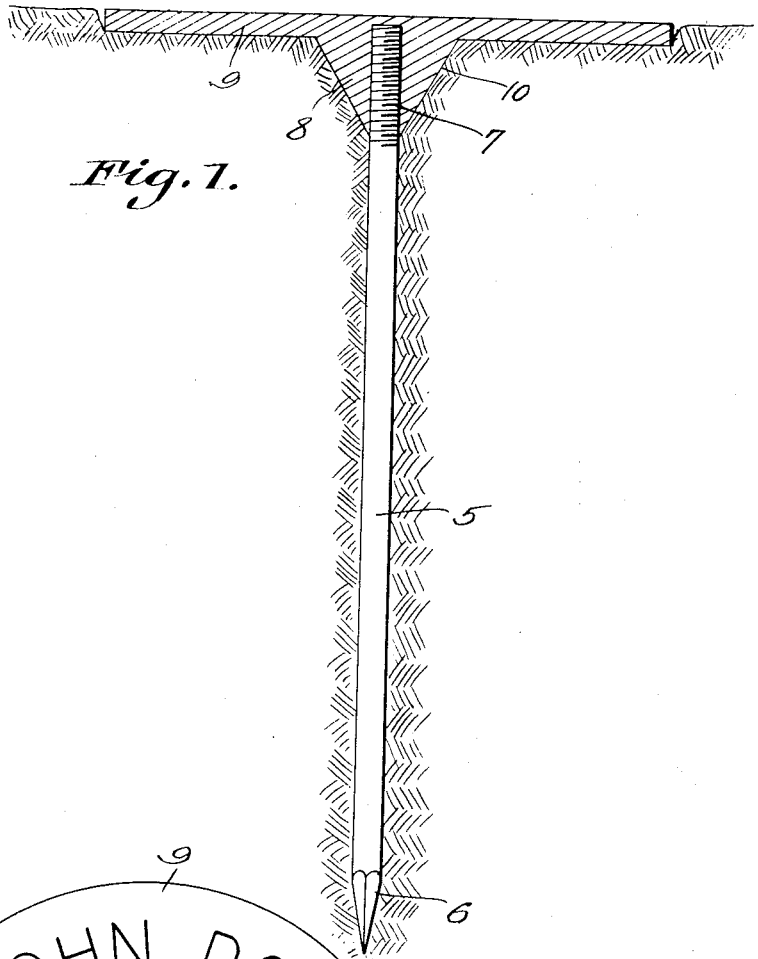
Figure 1 is a longitudinal sectional view through a device constructed in accordance with the invention.
Figure 2:
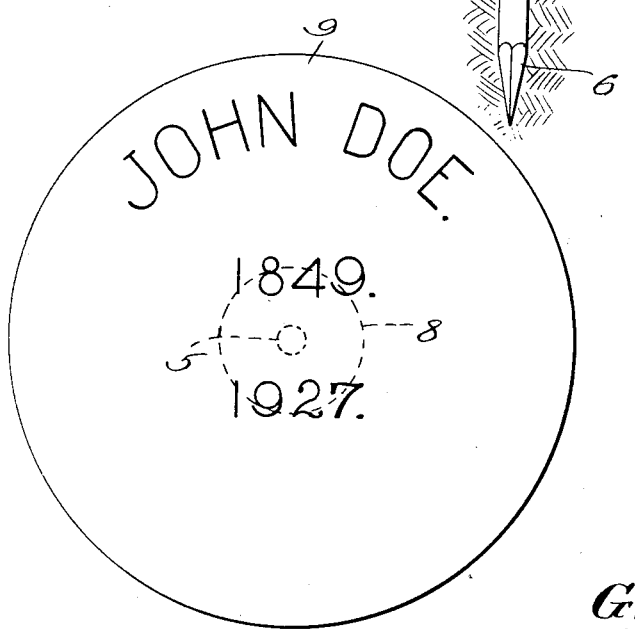
Figure 2 is a plan view thereof.

Referring to the drawing, the reference character 5 designates the shank of the marker, which is in the form of a spike, one end of the spike being tapered as at 6, so that it may be readily driven into the ground surface.

The upper end of the shank 5 is formed with threads 7 that cooperate with the threads of an opening formed in the enlargement 8, that extends from the bottom of the head 9, the enlargement 8 having an inwardly tapered edge 10, so that it may be driven into the ground surface.

This head 9, is preferably circular in formation, however it is to be understood that the contour of the head may be varied, to meet various requirements of design.

While the head may be constructed of any suitable material, I prefer to employ aluminum because of its extreme lightness, and weather resisting qualities.

As clearly shown by the drawing, the outer surface of the head is formed with indicia or characters spelling the name of the person buried, as well as the dates of birth and death.

From the foregoing it will be seen that due to the construction shown and described the marker when used for marking graves, may be driven into the ground surface, until the upper surface of the head lies flush with the ground surface, to the end that mowing machines may be passed thereover, and the marker will not in any way interfere with the grass mowing operation.

Having thus described the invention what is claimed is:

In a grave marker, a substantially thin metallic head, a tapered enlargement formed on the bottom of the head and disposed centrally thereto, said enlargement having a threaded bore, said bore terminating short of the top surface of the head, a spike having a threaded end fitted in the threaded bore, securing the spike to the head, said spike and tapered enlargement adapted to be embedded in the ground surface with the upper surface of the head lying flush with the ground surface.

GEORGE M. FROST.